(12) United States Patent
Hammons et al.

(10) Patent No.: US 7,506,039 B2
(45) Date of Patent: Mar. 17, 2009

(54) METHOD AND DEVICE FOR MANAGING CLUSTER MEMBERSHIP BY USE OF STORAGE AREA NETWORK FABRIC

(75) Inventors: Richard L. Hammons, Hammons, CA (US); Carlos Alonso, Los Gatos, CA (US)

(73) Assignee: Brocade Communications System, Inc., San Jose, CA (US)

( * ) Notice: Subject to any disclaimer, the term of this patent is extended or adjusted under 35 U.S.C. 154(b) by 1178 days.

(21) Appl. No.: 10/285,310

(22) Filed: Oct. 31, 2002

(65) Prior Publication Data

US 2004/0088396 A1    May 6, 2004

(51) Int. Cl.
    G06F 15/173    (2006.01)
(52) U.S. Cl. .................. 709/223; 709/203; 370/352
(58) Field of Classification Search .......... 709/248, 709/223, 203; 707/100; 370/351, 352
    See application file for complete search history.

(56) References Cited

U.S. PATENT DOCUMENTS 6,980,537 B1 *  12/2005  Liu ........................... 370/338
7,072,332 B2 *   7/2006  D'Souza ..................... 370/352
2003/0204509 A1 * 10/2003 Dinker et al. ............... 707/100

* cited by examiner

Primary Examiner—Jason Cardone
Assistant Examiner—Adnan M Mirza
(74) Attorney, Agent, or Firm—Wong, Cabello, Lutsch, Rutherford & Brucculeri, L.L.P.

(57) ABSTRACT

Managing cluster membership and providing and managing locks in the switches forming the interconnecting network. To manage the cluster membership, a zone is created, with indicated members existing in the zone and the zone being managed by the switches. The nodes communicate their membership events, such as alive messages, using an API to work with the switch to which they are attached. The desired membership algorithm is executed by the switches, preferably in a distributed manner. Each switch then enforces the membership policies, including preventing operations from evicted nodes. This greatly simplifies the programs used on the nodes and unburdens them from many time consuming tasks, thus providing improved cluster performance. In a like manner, the switches in the fabric manage the resource locks. The nodes send their lock requests, such as creation and ownership requests, to the switch to which they are connected using an API. The switches then perform the desired lock operation and provide a response to the requesting node. Again, this greatly simplifies the programs used on the nodes and unburdens them from many time consuming activities, providing improved cluster performance.

27 Claims, 9 Drawing Sheets

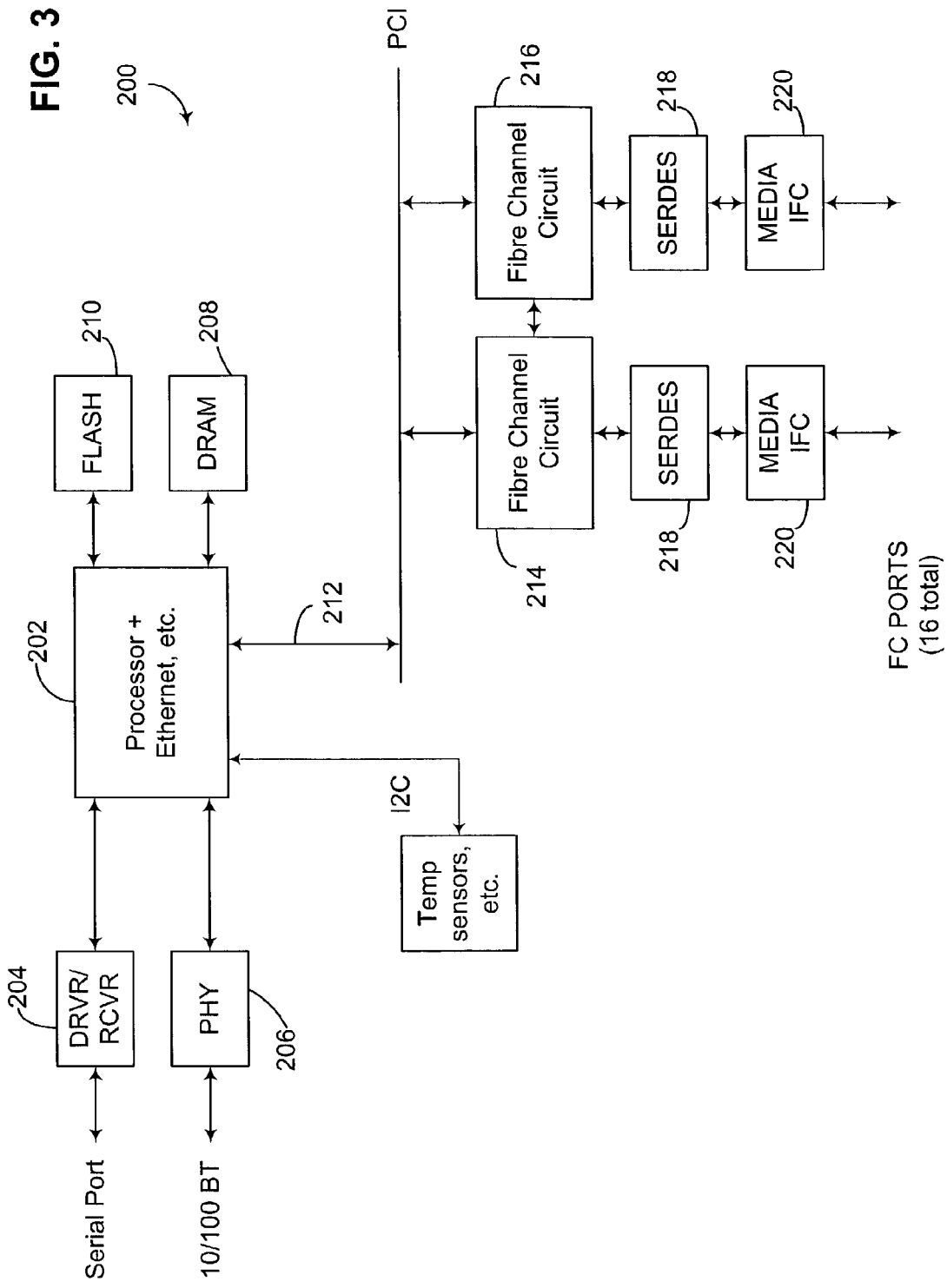

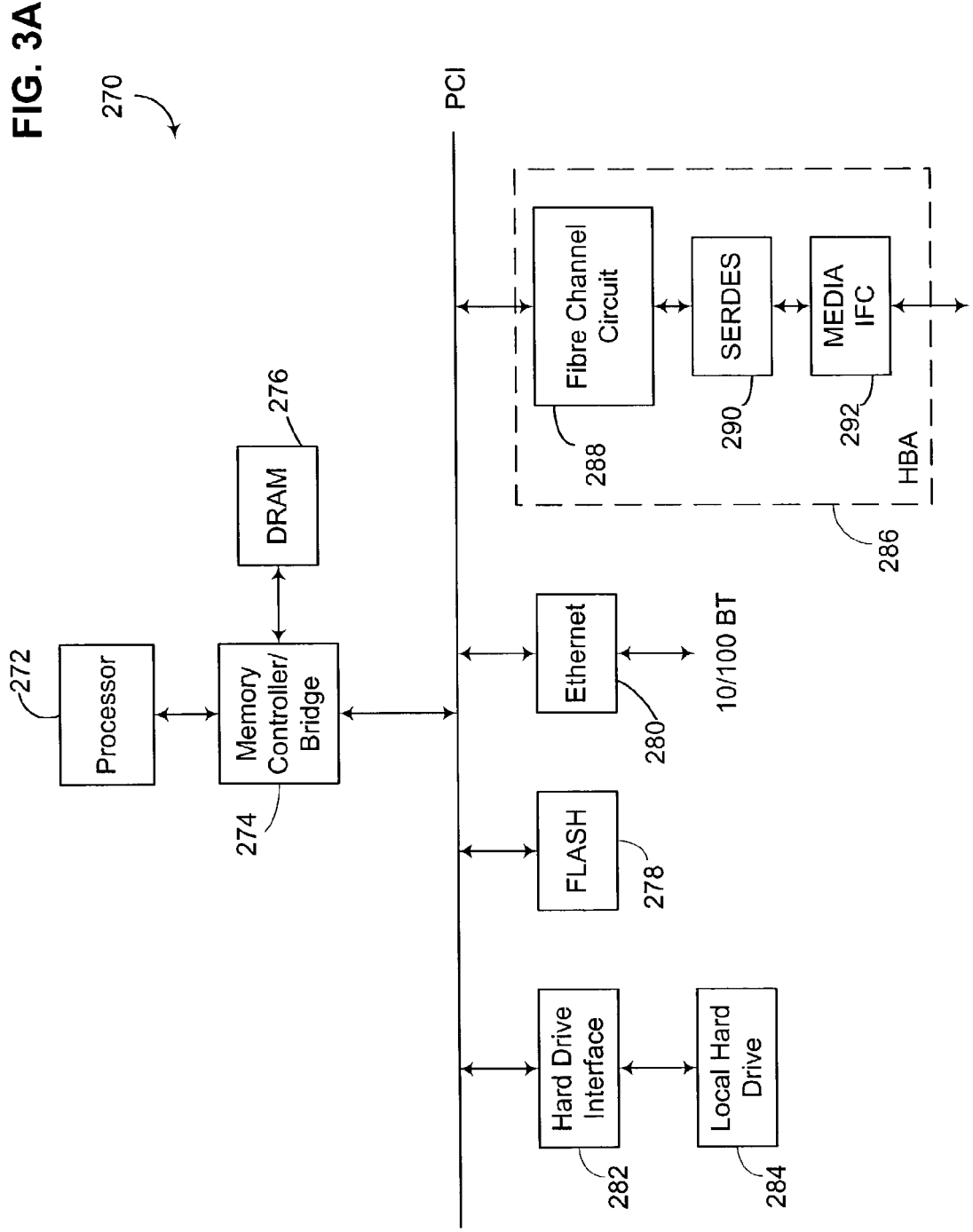

METHOD AND DEVICE FOR MANAGING CLUSTER MEMBERSHIP BY USE OF STORAGE AREA NETWORK FABRIC

BACKGROUND OF THE INVENTION

1. Field of Invention

The present invention relates to storage area networks, and more particularly to using elements in storage area network to manage cluster membership of hosts attached to the storage area network.

2. Description of the Related Art

Demand for higher performance computer systems is never ending. Increased performance is demanded at both the host processing side and at the storage side. to improve performance and flexibility of the connection between hosts and storage units, storage area networks (SANs) have developed. SANs provide the capability to flexibly connect hosts to storage, allowing improved performance while reducing costs. The predominate SAN architecture is a fabric developed using Fibre Channel switching. Fibre Channel is a series of ANSI standards defining a high speed communication interface. One property of Fibre Channel is that links can be point to point. When the devices are interconnected by a series of switches, a fabric is formed. The fabric allows routing communications between the various connected devices.

In addition to high performance connections between the hosts and the storage units, a second technique used to increase system performance is clustering of the hosts. By interconnecting hosts, they can work together on the various tasks of a common program. This technique requires high speed communications between the hosts to manage the operations. These communications can occur using numerous networking protocols, such as Ethernet, Fibre Channel, InfiniBand or Myrinet.

However, several problems occur when clustering hosts, which limits the performance gains available. A first problem is cluster membership management. Every host (or node as often called) needs to understand the group of valid members of the cluster. There is significant overhead and network associated with this activity, particularly as the number of nodes grows. Simplistically, each node must periodically communicate with each other node, which generates traffic and requires processing by the node, both when sending and when receiving. Then, if a node senses a problem, all of the nodes need to reach consensus on the cluster membership. This consensus process is time consuming and also generates additional network traffic. So it would be desirable to improve the membership management of a cluster to eliminate much of the processing overhead, traffic and consensus-building.

A second problem is resource sharing. Usually the various nodes will share various resources. But also usually only one node at a time can access the resource. This is addressed by locking the resource when a node has control. When using locking to gain control of the resource, the node performs an operation on the lock to determine if another node has control. If not, the node gains control. If another node has control, the requesting node continues to perform the operation until successful. Thus traffic over the network is generated to handle the lock operation. Usually this is traffic between nodes because a node is used to implement the shared memory used to form the lock. So this further hinders performance by frequent accesses to the node and creates overhead sending and receiving the operations. The problem becomes significant in most systems because there are a large number of locks that must be implemented, with a large number of nodes vying for control. It would be desirable to limit traffic and overhead required to maintain resource locks.

SUMMARY OF THE INVENTION

The preferred embodiments according to the present invention provide the capability to manage the cluster membership and to provide and manage locks in the switches forming the network.

To manage the cluster membership, a zone is created, with indicated members existing in the zone and the zone being managed by the switches. The nodes communicate their membership events, such as heartbeat messages, using an API to work with the switch to which they are attached. The desired membership algorithm is executed by the switches, preferably in a distributed manner. Each switch then enforces the membership policies, including preventing operations from evicted nodes. This greatly simplifies the programs used on the nodes and unburdens them from many time consuming tasks, thus providing improved cluster performance.

In a like manner, the switches in the fabric manage the resource locks. The nodes send their lock requests, such as creation and ownership requests, to the switch to which they are connected using sample common transport layer commands. The switches then perform the desired lock operation and provide a response to the requesting node. Again, this greatly simplifies the programs used on the nodes and unburdens them from many time consuming activities, providing improved cluster performance.

BRIEF DESCRIPTION OF THE DRAWINGS

FIG. 3 is a more detailed block diagram of switches according to an embodiment of the present invention.

FIG. 3A is a block diagram of a node according to an embodiment of the present invention.

Figure 1:
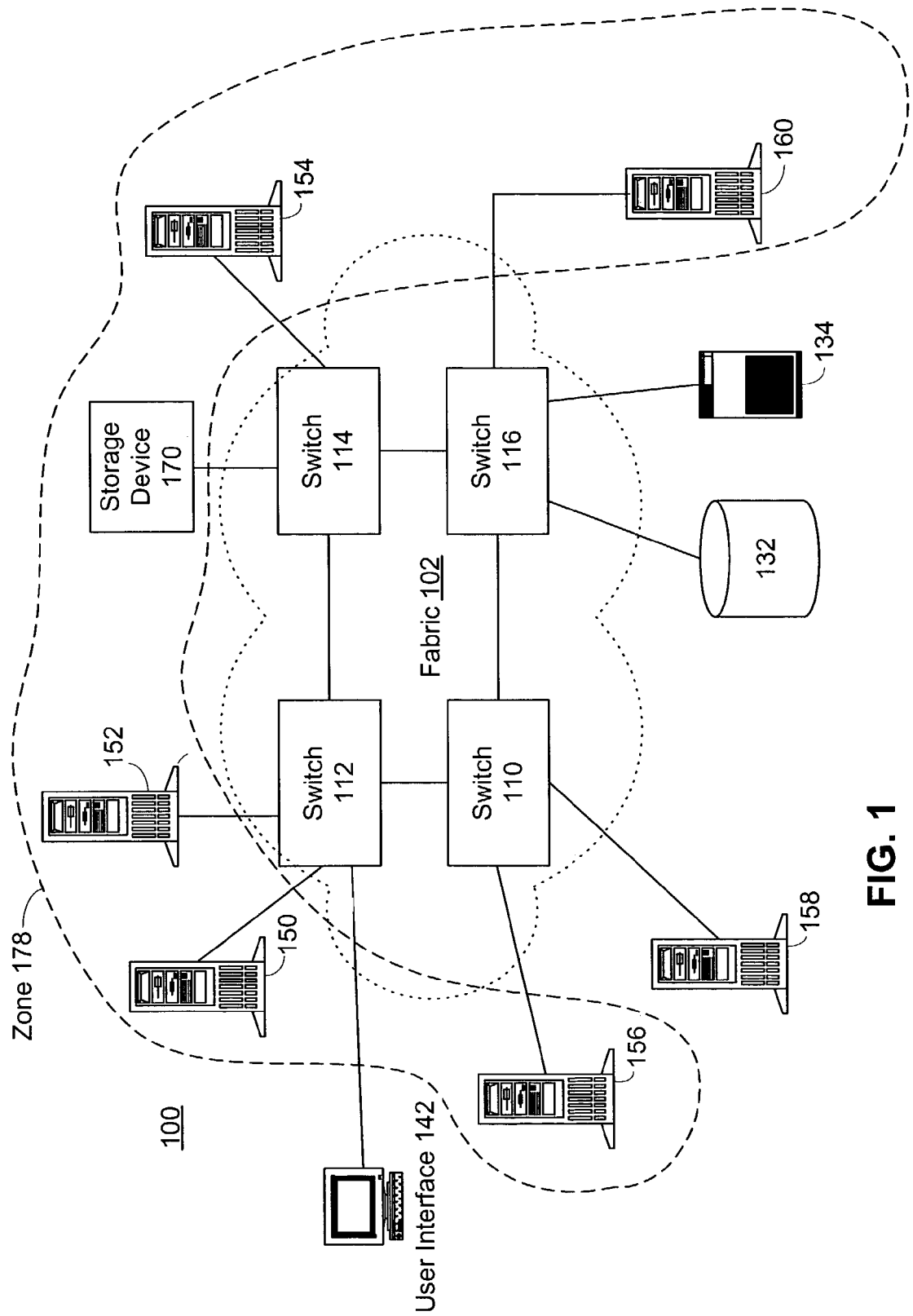
FIG. 1 illustrates a system diagram of a Fibre Channel network with a zone in an embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

A system and method for managing cluster membership and locks using a fabric in a Fibre Channel communications network is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts.

Fibre Channel Network Structure

FIG. 1 illustrates a Fibre Channel network 100 with a zone 178 of hosts or nodes specified in an embodiment of the present invention. Generally, the network 100 is connected using Fibre Channel connections, though other network interconnects such as Infiniband or Myrinet could be used. In the embodiment shown and for illustrative purposes, the network 100 includes a fabric 102 comprised of four different cluster control switches 110, 112, 114, and 116. It will be understood by one of skill in the art that a Fibre Channel fabric may be comprised of one or more switches.

A variety of devices can be connected to the fabric 102. A Fibre Channel fabric supports both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices are coupled to the fabric via fabric ports. A fabric port (F_Port) supports a point-to-point fabric attachment. Typically, ports connecting one switch to another switch are referred to as expansion ports (E_Ports).

On the device side, each device coupled to a fabric constitutes a node. Each device includes a node port by which it is coupled to the fabric. A port on a device coupled in a point-to-point topology is a node port (N_Port). The label N_Port may be used to identify a device, such as a computer or a peripheral, which is coupled to the fabric.

In the embodiment shown in FIG. 1, fabric 102 includes switches 110, 112, 114 and 116 that are interconnected. Switch 110 is attached to hosts or nodes 156 and 158. Switch 112 is attached to nodes 150 and 152. Switch 114 is attached to storage device 170. Typically, storage device 170 is a storage device such as a RAID device. Alternatively the storage device 170 could be a JBOD or just a bunch of disks device. Switch 116 is attached to storage devices 132 and 134, and is also attached to node 160. A user interface 142 also connects to the fabric 102.

Overview of Zoning within the Fibre Channel Network

Zoning is a fabric management service that can be used to create logical subsets of devices within a Storage Area Network, and enables the partitioning of resources for the management and access control of frame traffic. More details on zoning and how to implement zoning are disclosed in commonly assigned U.S. Pat. application Ser. No. 09/426,567 entitled "Method and system for Creating and Formatting Zones Within a Fibre Channel System," by David Banks, Kumar Malavalli, David Ramsay, and Teow Kah Sin, filed Oct. 22, 1999, and Ser. No. 10/123,996, entitled "Fibre Channel Zoning by Device Name in Hardware," by Ding-Long Wu, David C. Banks and Jieming Zhu, filed Apr. 17, 2002, which are hereby incorporated by reference.

Still referring to FIG. 1, a zone 178 nodes 150, 152, 154, 156 and 160 and storage device 170. A zone indicates a group of source and destination devices allowed to communicate with each other. In this case zone 178 exemplary cluster. An exemplary use of this cluster would be execution of a large database.

Figure 2:
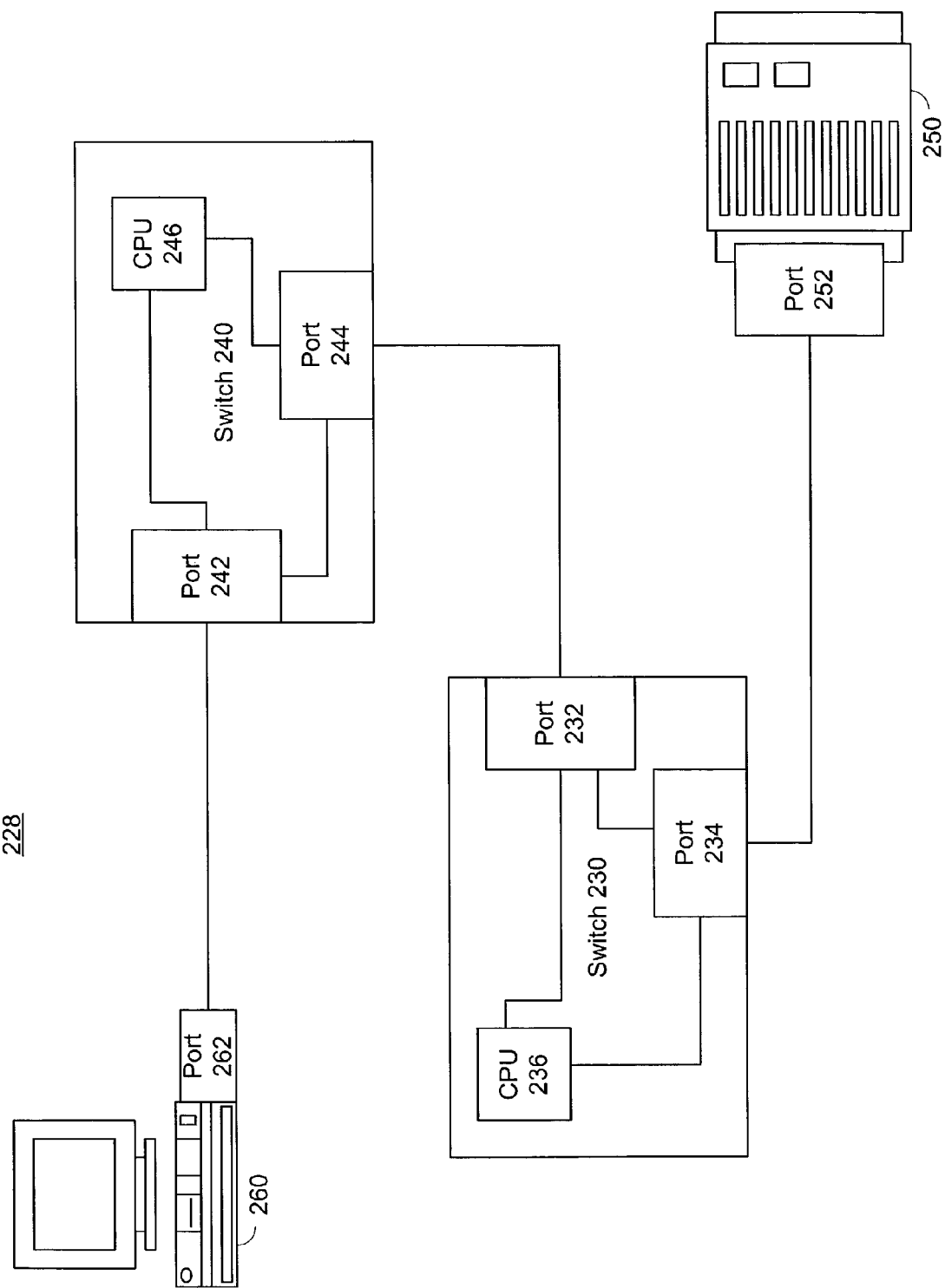
FIG. 2 is a block diagram of a system indicating an example of the connections within a Fibre Channel fabric according to an embodiment of the present invention.

FIG. 2 is a block diagram of a system 228 indicating an example of the connections used within a Fibre Channel fabric according to an embodiment of the present invention. In the example shown, system 2 includes two cluster control switches 240 and 230, a device 260 and a device 250. Switch 240 includes a central processing unit (CPU) 246 for managing its switching and cluster functions, and switch 230 includes a CPU 236 for managing its switching and cluster functions. Switch 240 includes two ports 242 and 244; switch 230 includes two ports 232 and 234. The number of ports shown on each switch is purely representative; and it will be evident to one of ordinary skill in the art that a switch may contain more or fewer ports. Device 260 is communicatively coupled via its node port 262 to port 242 on switch 240. Device 250 is communicatively coupled via its node port 252 to port 234 on switch 230. Switch 240 and switch 230 are interconnected via ports 244 and 232.

FIG. 3 illustrates a basic block diagram of a cluster control switch 200, such as switches 110, 112, 114, 16, 230 or 240 according to the preferred embodiment of the present invention. A processor and I/O interface complex 202 provides the processing capabilities of the switch 200. The processor may be any of various suitable processors, including the Intel i960 and the Motorola or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

FIG. 3A is a general block diagram of an exemplary node 270. It is understood that this diagram is for illustration purposes and many other variations are suitable for the node. A processor 272 is connected to a memory controller/bridge chip 274. DRAM or main memory 276 is connected to the chip 274 to provide the main program memory used by the node 270. A PCI bus is connected to the chip 274, with various devices connected to the PCI bus. A flash memory 278 provides permanent boot memory. A hard drive interface 282 is connected to a hard drive for local storage of the operating systems and programs. An Ethernet interface 280 provides a local area network connection. A host bus adaptor or HBA 286 provides the connection to the fabric. The HBA 286 includes a Fibre Channel circuit 288, a SERDES 290 and a media interface 292.

Figure 4A:
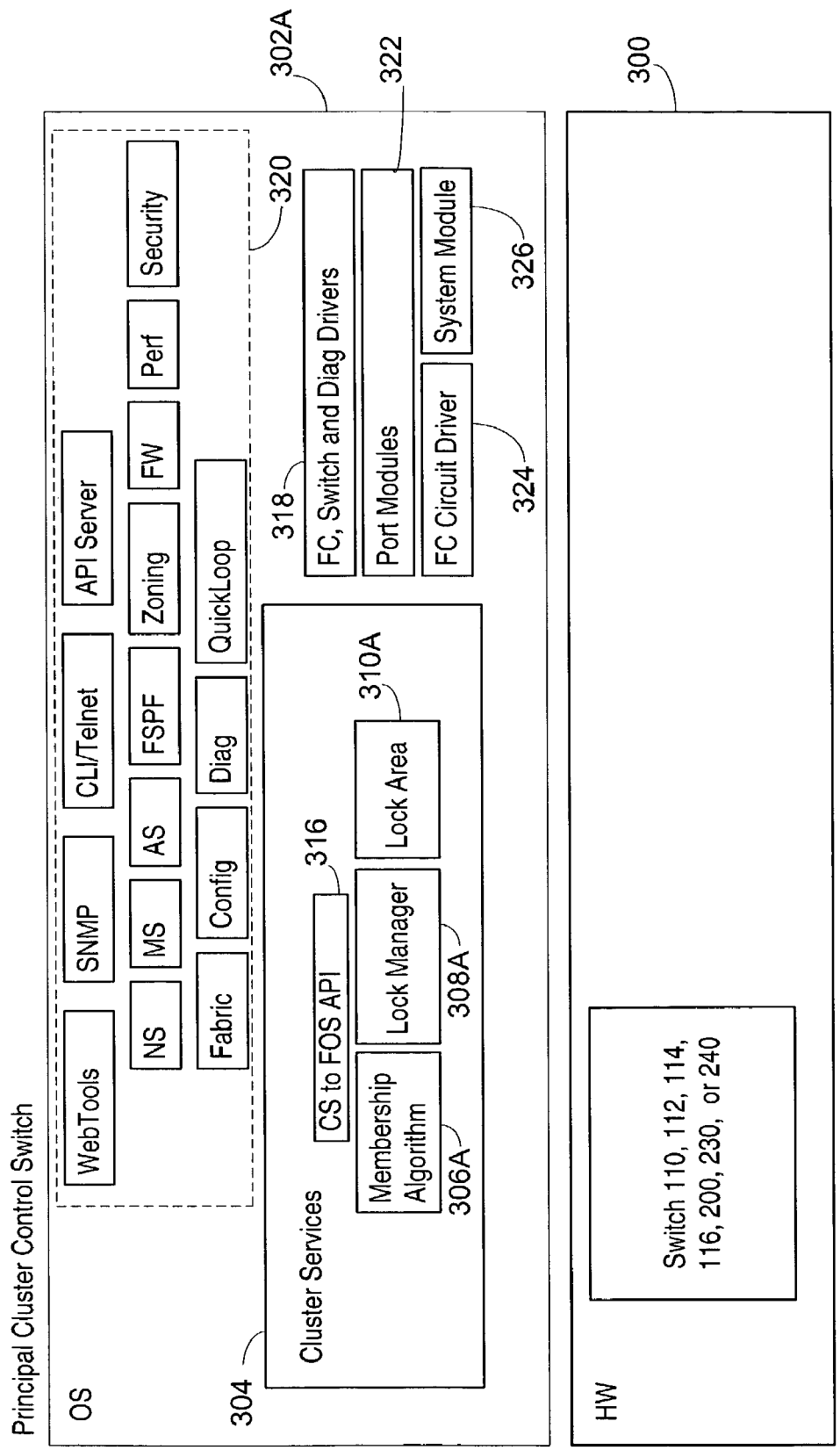
FIG. 4A is a block diagram of one embodiment of a principal switch suitable for cluster membership and lock management in accordance with the present invention.

Proceeding then to FIG. 4, a general block diagram of the cluster control switch 110, 1112, 114, 16, 200, 230 or 240 hardware and software is shown. Block 300 indicates the hardware as previously described. Block 302A is the basic software architecture of a principal cluster control switch. Generally think of this as the principal switch operating system and all of the particular modules or drivers that are operating within that embodiment. One particular block is the cluster services 304. The cluster services 304 has various blocks including a membership algorithm block 306A, a lock manager block 308A, a lock area 310A, and an API block 316 to interface the cluster services to the operating system 302 and driver modules 318 to operate with the devices in the hardware 300. Other modules operating on the operating system 302 are Fibre Channel, switch and diagnostic drivers 320; port modules 322, if appropriate; a driver 324 to work with the Fibre channel circuits; and a system module 326. In addition, because this is a fully operational switch as well as a cluster control switch, the normal switch modules for switch management and switch operations are generally shown in the dotted line 320. This module will not be explained in more detail.

Figure 4B:
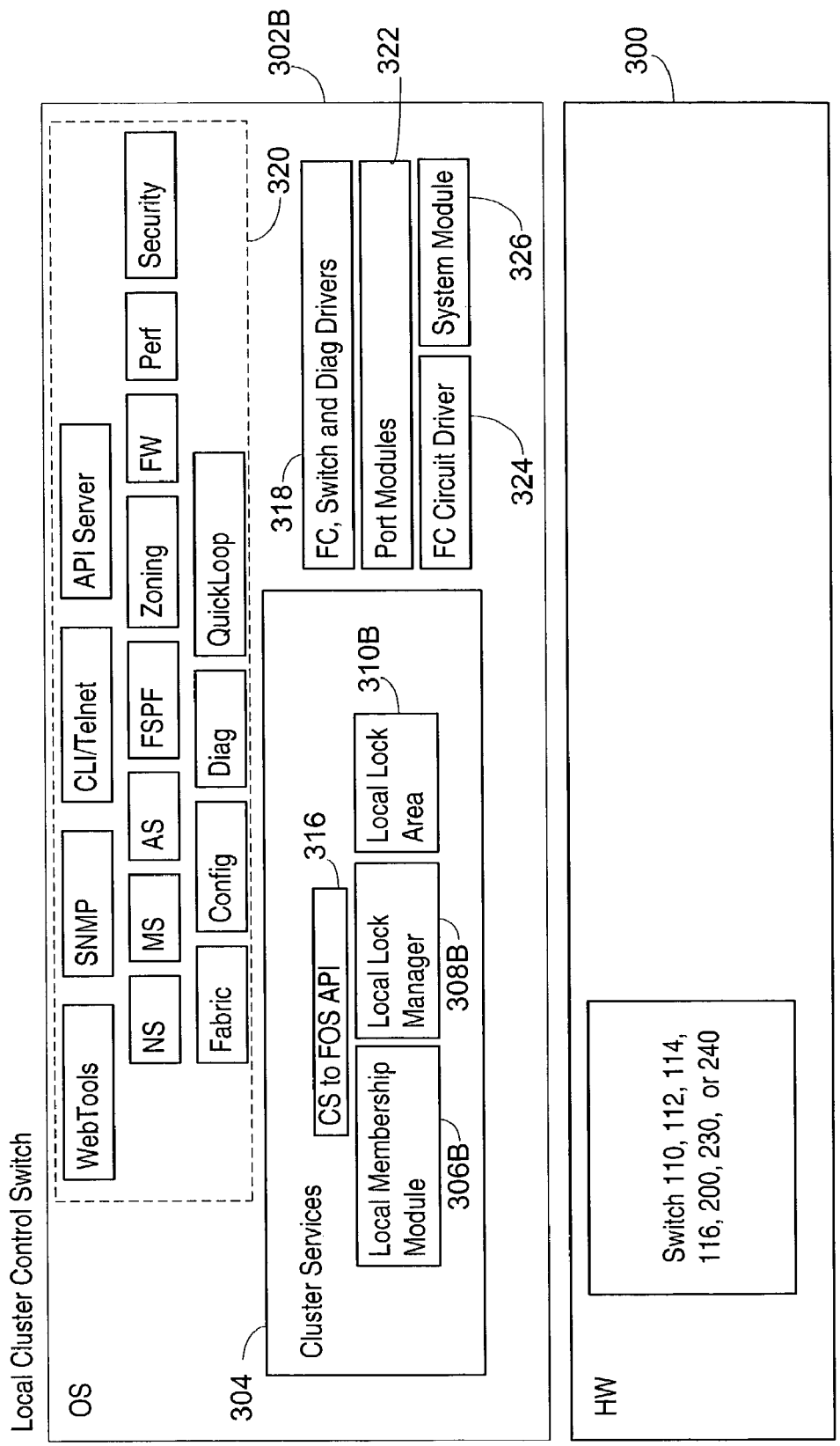
FIG. 4B is a block diagram of one embodiment of a local switch suitable for cluster membership and lock management in accordance with the present invention.

A local cluster control switch 302B is shown in FIG. 4B. The local switch 302B is very similar to the principal switch 302A, except that the local switch 302B includes a local membership module 306B, a local lock manager 308B and a local lock area 310B. As will be described in more detail below, the local versions of the modules only act as interfaces between the nodes and the principal switch 302A, storing only local information, such as caching local copies of lock status for nodes connected to the local switch. The membership algorithm module 306A performs the primary membership functions, while the lock manager module 308A performs the primary or fabric-wide lock function, keeping the lock information in the lock area 310A. A given switch can preferably include both the local and principal modules, with the principal modules being active if the switches collectively select that switch to act as the principal switch.

Figures 5, 6:
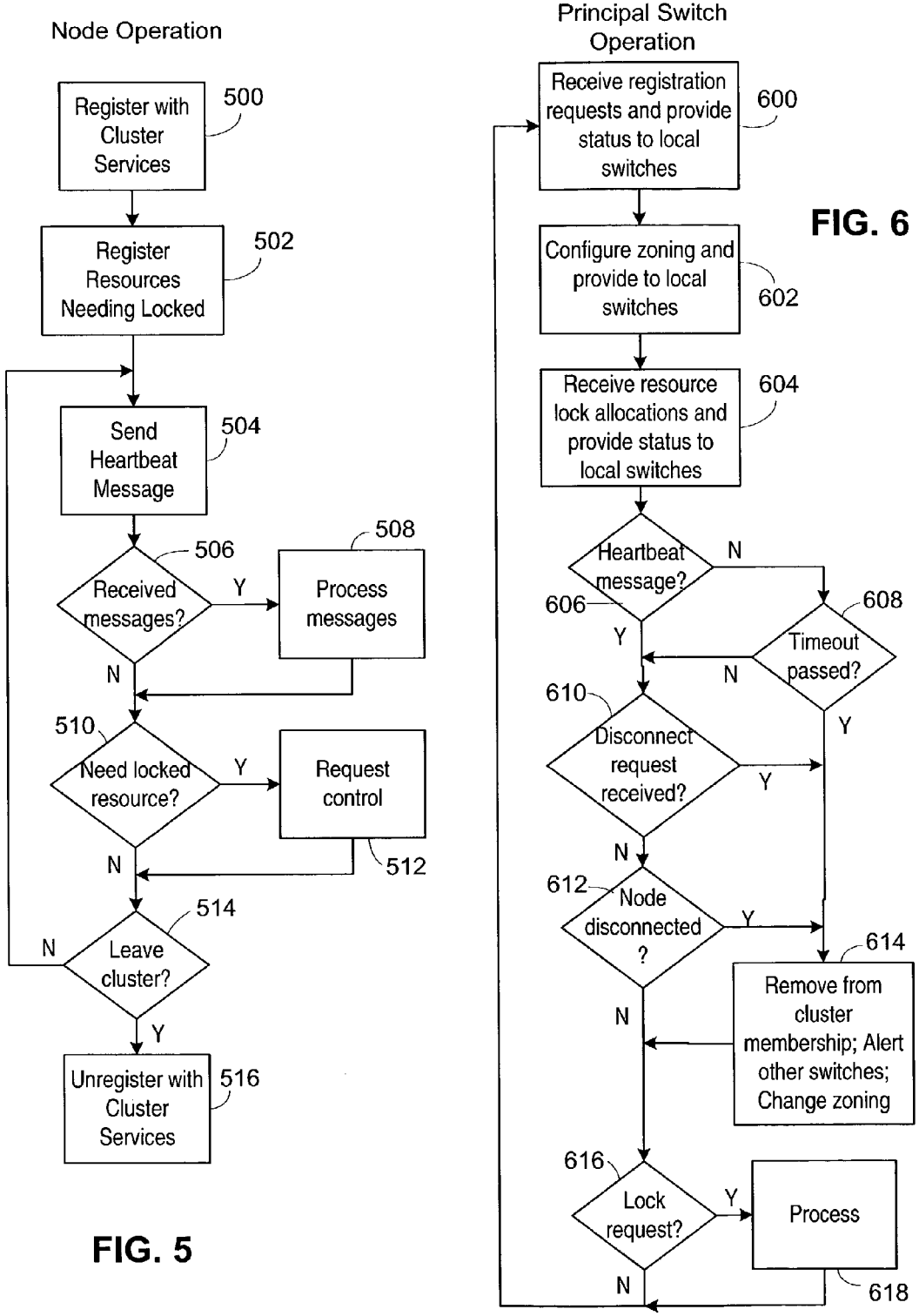
FIG. 5 is a flowchart of node operations according to the present invention.
FIG. 6 is a flowchart of principal switch operations according to the present invention.

Operation of a node according to the present invention is shown in FIG. 5. In a first step 500 the node registers with the cluster services in step 500. This is done by sending an appropriate call using a cluster membership message addressed to the local switch to which it is connected. The cluster membership message is formed using the proper API to the local switch to which it is connected. Control then proceeds to step 502 where particular resources which need to be locked are also registered with the principal switch, preferably using common transport (CT) logic commands developed for lock management. This can be done using a lock message addressed to a well known address.. Control then proceeds to step 504 where the node sends a heartbeat message, a different cluster membership message, to indicate that it is properly operational and so needs to be considered operational as part of the cluster. Control proceeds to step 506 to determine if the node has received any messages from the switch. If so, control proceeds to step 508 where these messages are processed. These messages will generally relate to membership information, such as the status of other nodes connected to the cluster. If no messages are received in step 506, or after execution of step 508, control proceeds to step 510 to determine if the node needs a locked resource. If so, control proceeds to step 512 where a lock message is sent to the switch using the API to request control of the particular locked resource. If the resource is not needed in step 510 or control is requested in step 512, control proceeds to step 514 to determine if the node desires to leave the cluster. If not, control loops back up to step 504 where another heartbeat message is sent to the switch. If it does desire to leave the cluster in step 514, control proceeds to step 516 where the node unregisters with switch cluster services.

It is noted that while this is shown in FIG. 5 as a sequential or polled manner, in most cases these would be different threads which are operating inside the node so that they would actually be occurring simultaneously. For example, heartbeat messages would be sent periodically based on a timer routine, while received messages would be activated based on interrupt receipt of a particular message. Further, the need for locked resources would be occurring for a particular module which needed the particular resources. Thus this drawing of FIG. 5 is shown in a simplistic form to show the general operation of the node.

It is also noted that FIG. 5 does not show the various data messages, which are transferred between the nodes to transfer data between the nodes. These data messages are addressed to the appropriate node and are transferred through the switches forming the fabric as appropriate.

FIG. 6 illustrates principal switch operation for the cluster services according to the present invention. In step 600 the switch receives the various registration requests, a type of cluster membership message, forwarded from the local switches and provides a status message back to the local switch. Control then proceeds to step 602, where the principal switch sets up the proper zoning to isolate and configure the proper cluster zones. This zoning information is provided to each of the local switches so the zoning hardware can be appropriately configured. This can be done as shown in above-referenced applications. Control then proceeds to step 604 to receive any resource lock allocations forwarded from the local switches. In this step the principal switch sets up the various lock areas requested by the nodes using a lock message and provides a status response back to the local switch. Control then proceeds to step 606 to determine if a heartbeat message has been forwarded from a local switch. This would indicate that a particular node is still alive and should properly remain in the membership of the cluster. Control proceeds to step 608 message has been received to determine if a particular timeout for that particular node has passed. If not, control proceeds to step 610, which is also where control would proceed after step 606 if a message had been received. In step 610 the switch determines if a disconnect request has been forwarded from a node because the node desires to unregister from the cluster. If not, control proceeds to step 612 to see if the node has been physically disconnected from the fabric, based on a message from a local switch. If the timeout has passed in step 608, a disconnect request has been received in step 610 or the node has been physically disconnected in step 612, control proceeds to step 614 where the principal switch removes the particular node from cluster membership according to the desired cluster membership algorithms. Numerous different membership algorithms could be utilized as desired. During this process the principal switch also alerts the local switches and the nodes using cluster membership messages so that each switch in the fabric and node in the cluster is aware of the particular cluster membership at any given time. Further, the principal switch also changes the zoning to indicate that the node has been removed, which zoning changes are sent to the local switches. Preferably this is done by changing the zoning so that the affected node only has read-only privileges and cannot write to any devices in the cluster, including the hosts and storage devices. Control proceeds from step 614 or if the node has not been disconnected in step 612, to step 616 to determine if a lock request has been forwarded by a local switch. If so, control proceeds to step 618 where the particular lock request is processed by the lock management module to determine if the particular process or resource is locked. A reply is provided to the local switch of an acknowledgement or any rejection.. It is also noted that as in FIG. 5, the operations are shown in a polled or sequential manner for ease of explanation but in most cases the various requests or messages would be handled as received.

It is noted that transferring of the data messages between the nodes is not shown in FIG. 6. This is because those transfers would occur as basic hardware switching functions of the switches, and thus are not part of the cluster services illustrated in FIG. 6.

Figure 7:
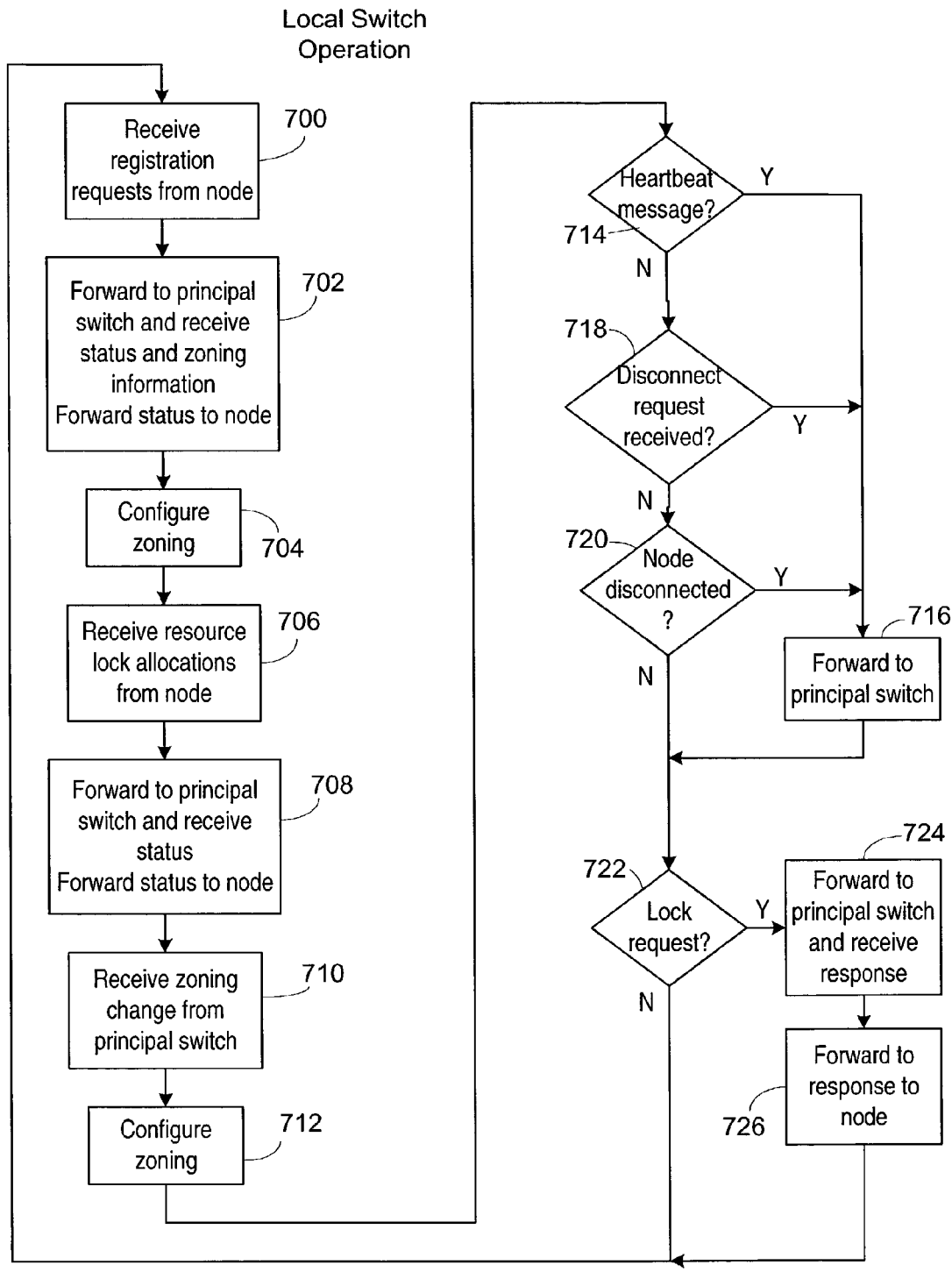
FIG. 7 is a flowchart of local switch operations according to the present invention.

FIG. 7 illustrates local switch operation for the cluster services according to the present invention. In step 700 the local switch receives the various registration requests from the nodes. Control then proceeds to step 702, where the registration request is forwarded to the principal switch, with the principal switch returning a status message and any changes in zoning. The status message is forwarded to the node. In step 704 the local switch sets up the proper zoning to isolate and configure the proper cluster zones. Control then proceeds to step 706 to receive any resource lock allocations from the nodes. In step 708, the local switch forwards the lock allocations to the principal switch and sets up a local, cached copy in the local lock area 310B. Also in step 708 the local switch receives a status message from the principal switch and forwards it to the node.

Control then proceeds to step 710 to receive any zoning changes received from the principal switch. As described above, the principal switch preferably handles the membership algorithm. Should the principal switch determine that a node needs to be removed, it will forward the appropriate zoning changes to all the local switches. For example, if a node has become non-responsive, the principal switch could tell each local switch to zone that node for read-only operation so that the node cannot corrupt the database. At a later time the node could receive full rights, but only after it satisfies membership requirements for the cluster. The received zoning changes are applied in step 712.

Control then proceeds to step 714 to determine if a heartbeat message has been received. This would indicate that a particular node is still alive and should properly remain in the membership of the cluster. Control proceeds to step 718 if no message has been received to determine if a disconnect request has been received from a node because the node desires to unregister from the cluster. If not, control proceeds to step 720 to see if the node has been physically disconnected from the fabric. If a heartbeat message was received in step 714, a disconnect request has been received in step 718 or the node has been physically disconnected in step 720, control proceeds to step 716 where the local switch forwards the message or status change to the principal switch.

Control proceeds from step 716, or if the node has not been disconnected in step 720, to step 722 to determine if a lock request has been received. If so, control proceeds to step 724 where the particular lock request is forwarded by the local lock management module 308B in the local switch to the principal switch and a response is received from the principal switch. The response is forwarded to the node on step 726, with the state cached in the local lock area 310B. Control then proceeds from steps 722 or 726 to step 700. It is also noted that as in FIG. 6, the operations are shown in a polled or sequential manner for ease of explanation but in most cases the various requests or messages would be handled as received.

It is noted that transferring of the data messages between the nodes is not shown in FIG. 7. This is because those transfers would occur as basic hardware switching functions of the switches, and thus are not part of the cluster services illustrated in FIG. 7.

The above example of cluster membership and lock management has been done using a single fabric for ease of explanation. In many cases Fibre Channel fabrics are often duplicated between devices to provide redundancy. This is shown in illustrative form in FIG. 8. Network servers 800 and 804 and mainframe 804 are each connected to fabric (1) 808 and fabric (2) 806. Disk arrays 810 and 812 are also each connected to fabric (1) 808 and fabric (2) 806. Thus there are two paths between any device, providing the desired redundancy. However, this arrangement complicates cluster membership and lock operations. While it would be possible to run those operations independently in each fabric, it is desirable to insure that the two fabrics are synchronized. Therefore, an inter-fabric cluster controller 814 is preferably provided. The controller 814 is connected to fabric (1) 808 fabric (2) 806 by links 818 and 820, respectively. The actual control unit 816 is connected to these links. The block diagram of the control unit 816 is similar to the block diagram of switch 200.

Preferably the controller 814 does not pass messages, either cluster membership, lock or data between the fabrics 808 and 806, though it may perform normal data message switching functions for each fabric independently if desired. In the preferred embodiment the controller 814 acts as the principal switch for each fabric. The controller 814 has additional software modules to check for consistency between the cluster membership and lock status of each fabric. Should an inconsistency develop, the controller 814 will send appropriate messages to each fabric 808 and 806 to maintain the consistency.

Figure 8:
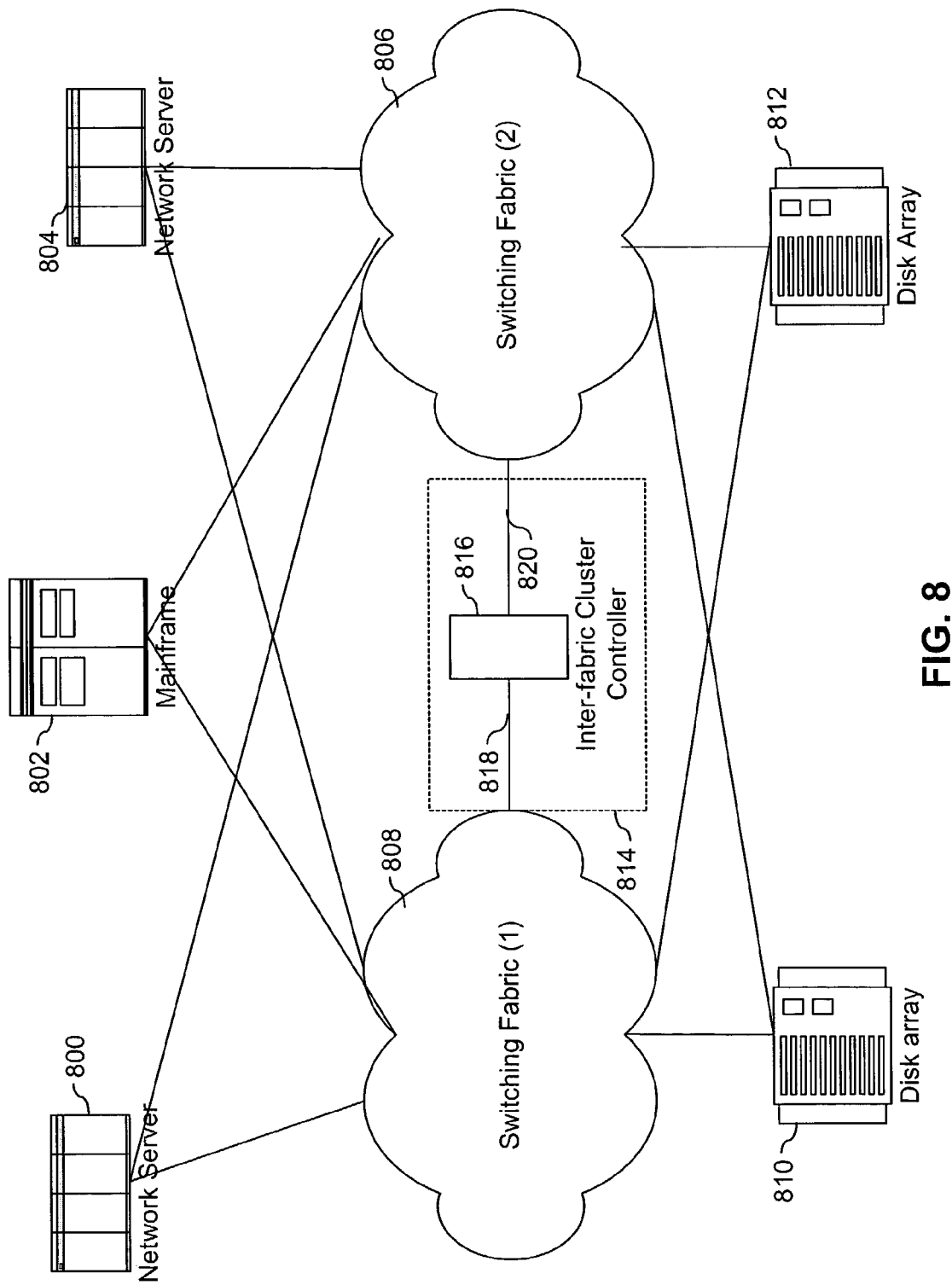
FIG. 8 illustrates an alternative embodiment of the present invention in a redundant fabric environment.

FIG. 8 illustrates an additional problem which may occur. As can be seen, each device has two Fibre channel ports. But locks and cluster membership are based on the node, or software instance executing on the node, not on each Fibre channel port. Thus the registration and allocation requests, and cluster membership and lock ownership, are preferably based on the node or process, not the Fibre Channel port. For this description, it is assumed that the various messages are provided appropriately and the various switches and controllers base operations at the appropriate level for the particular action.

An additional point which should be addressed is the failure of the local or principal switches. If a local switch fails, new locks associated with nodes connected to that local switch would not registered but previously existing locks would operate normally. If a principal switch fails, no new locks will be registered and a new principal switch will be elected from the local switches. Each local switch will provide its cached local lock information to the new principal switch to recreate the principal lock area. The principal switch will verify the lock ownership and normal operation will resume.

The cluster membership operation described above is the preferred embodiment. However, a more simplified version can be implemented according to the invention. In the simplified version the principal switch does not perform the membership algorithm but instead broadcasts messages to all of the cluster nodes if an event affecting cluster membership occurs, such as a missing heartbeat message or a link failure, with the nodes thus communicating among themselves directly to determine the proper response. While this simple approach does not relieve the hosts from as much processing and message handling as the preferred embodiment, it is believed that there will still be a marked reduction because the membership affecting events will be very infrequent in normal operation.

In addition, while the preferred embodiment performs the distributed operation by use of local switches and a principal switch, fully equal switches could be utilized, with each switch providing messages to update all other switches or by having switches responsible only for their local nodes and query the other switches for other operations, as in distributed name server operation. This equal switch organization would work satisfactorily in small fabrics, but operation would degrade for larger fabrics and for that reason the local and principal organization is preferred.

Therefore it can be seen in the particular disclosed cluster control switch both the cluster management and the cluster lock activities. The operations and communications of the particular hosts or nodes in the cluster are offloaded, as is the complicated processing. Therefore performance of the nodes is increased, increasing overall cluster performance.

Although the invention has been described in considerable detail with reference to certain embodiments, other embodiments are possible. As will be understood by those of skill in the art, the invention may be embodied in other specific forms without departing from the essential characteristics thereof. For example, different numbers of ports (other than the four ports illustrated herein) may be supported by the zone group based filtering logic. Additionally, the hardware structures within the switch may be modified to allow additional frame payload bytes to be read and used for frame filtering. Accordingly, the present invention is intended to embrace all such alternatives, modifications and variations as fall within the spirit and scope of the appended claims and equivalents.

What is claimed is:

1. A network comprising:
   a plurality of nodes forming a cluster, each node including a communications port for transferring messages, said messages including data messages for other nodes and cluster membership messages; and
   a device separate from said plurality of nodes and not a portion of said cluster for transferring messages, said device coupled to each of said nodes forming said cluster, said device transferring data messages between said nodes and receiving cluster membership messages from said nodes, said device including:
   a plurality of communications ports coupled to said nodes;
   a processor;
   memory coupled to said processor and storing programs executed by said processor; and
   logic coupled to said communications ports and said processor and transferring data messages between said communications ports and cluster membership messages between said ports and said processor,
   wherein said stored programs include a program for controlling cluster membership, said processor executing said cluster membership stored program to process cluster membership messages from said nodes.

2. The network of claim 1, further comprising:
   a second device separate from said plurality of nodes and not a portion of said cluster for transferring messages, said second device coupled to each of said nodes forming said cluster, said second device transferring data messages between said nodes and receiving cluster membership messages from said nodes, said second device including:
   a plurality of communications ports coupled to said nodes;
   a processor;
   memory coupled to said processor and storing programs executed by said processor; and
   logic coupled to said communications ports and said processor and transferring data messages between said communications ports and cluster membership messages between said ports and said processor,
   wherein said device and said second device are coupled together, wherein said second device is connected to at least one of said nodes and processes cluster membership messages from said nodes to which it is connected, and wherein said device and said second device exchange cluster membership messages.

3. The network of claim 2, wherein said cluster membership messages exchanged between said device and said second device include messages indicating the removal of a node from said cluster.

4. The network of claim 3, wherein said cluster membership messages received by said device and said second device from said nodes include heartbeat messages indicating status of said node.

5. The network of claim 2, wherein said device maintains cluster membership for the network and said second device forwards cluster membership messages between said nodes and said device.

6. The network of claim 5, further comprising at least one additional second device separate from said plurality of nodes and not a portion of said cluster, connected to at least one node, coupled to each of said nodes forming said cluster and said device and transferring data messages between said nodes and receiving cluster membership messages from said nodes, wherein said second device processes cluster membership messages from said nodes to which it is connected, and wherein said device and said additional second device exchange cluster membership messages.

7. The network of claim 1, wherein said cluster membership messages received by said device from said nodes include heartbeat messages indicating status of said node.

8. A device for use with a plurality of nodes forming a cluster, the device separate from said plurality of nodes and not a portion of said cluster, each node including a communications port for transferring messages, the messages including data messages for other nodes and cluster membership messages, the device comprising:

a plurality of communications ports for coupling to the nodes;

a processor;

memory coupled to said processor and storing programs executed by said processor; and logic coupled to said communications ports and said processor and transferring data messages between said communications ports and cluster membership messages between said ports and said processor, wherein said stored programs include a program for controlling cluster membership, said processor executing said cluster membership stored program to process cluster membership messages from the nodes.

9. The device of claim 8, the device also for use with a second device for transferring messages, the second device separate from said plurality of nodes and not a portion of said cluster and coupled to each of the nodes forming the cluster, the second device transferring data messages between the nodes and receiving cluster membership messages from the nodes, wherein said device communication ports are further for coupling to the second device, wherein the device is connectable to at least one of the nodes and processes cluster membership messages from the nodes to which it is connectable, and wherein the device can exchange cluster membership messages with the second device.

10. The device of claim 9, wherein said cluster membership messages which can be exchanged between the device and the second device include messages indicating the removal of a node from the cluster.

11. The device of claim 10, wherein said cluster membership messages received by the device from the nodes include heartbeat messages indicating status of the node.

12. The device of claim 8, wherein said cluster membership messages received by the device from the nodes include heartbeat messages indicating status of the node.

13. A node which is one of a plurality of nodes forming a cluster, the node comprising:

a communications port for transferring messages, said messages including data messages for other nodes and cluster membership messages, said communications port for coupling to a device for transferring messages, the device coupled to each of the nodes forming the cluster, the device separate from said plurality of nodes and not a portion of said cluster and transferring data messages between the nodes and receiving cluster membership messages from the nodes;

a processor;

memory coupled to said processor and storing programs executed by said processor; and logic coupled to said communications port and said processor and transferring data messages between said communications port and said processor, said data messages addressed to the other nodes, and transferring cluster membership messages between said communications port and said processor, said cluster membership messages addressed to the device.

14. The node of claim 13, wherein said cluster membership messages addressed to the device from the node include heartbeat messages indicating status of the node.

15. A method for managing cluster membership, the cluster formed by a plurality of nodes, each node including a communications port for transferring messages, the messages including data messages for other nodes and cluster membership messages, with each of the nodes coupled to a device for transferring messages, the device separate from said plurality of nodes and not a portion of said cluster and transferring data messages between the nodes and receiving cluster membership messages from the nodes, the method comprising:

transmitting data messages from a node, said data messages addressed to another node;

providing said data messages to the addressed node;

transmitting cluster membership messages from a node;

providing said cluster membership messages to the device; and controlling cluster membership in the device based on received cluster membership messages.

16. The method of claim 15, wherein there is a second device separate from said plurality of nodes and not a portion of said cluster for transferring messages, the second device coupled to each of the nodes forming the cluster and to the device, the second device transferring data messages between the nodes and receiving cluster membership messages from the nodes, wherein the second device is connected to at least one of the nodes and processes cluster membership messages from the nodes to which it is connected, the method further comprising:

exchanging cluster membership messages between the device and the second device.

17. The method of claim 16, wherein said cluster membership messages exchanged between the device and the second device include messages indicating the removal of a node from the cluster.

18. The method of claim 16, wherein said cluster membership messages received by the device and the second device from the nodes include heartbeat messages indicating status of the node.

19. The method of claim 16, wherein the device maintains cluster membership for the network and the second device forwards cluster messages between the nodes and the device.

20. The method of claim 19, wherein there is at least one additional second device separate from said plurality of nodes and not a portion of said cluster, connected to at least one node, coupled to each of the nodes forming the cluster and to the device and processing cluster messages from the nodes to which it is connected, the method further comprising:

exchanging cluster membership messages between the device and the additional second device.

21. The method of claim 15, wherein said cluster membership messages received by the device from the nodes include messages indicating alive status of the node.

22. A device for use with a plurality of nodes forming a cluster, the device separate from said plurality of nodes and not a portion of said cluster, each node including two communications ports for transferring messages, the messages including data messages for other nodes and cluster membership messages, one of the communication ports connected to a first fabric and the other of the communications connected to a second fabric for each node, the device comprising:

a plurality of communications ports for coupling to the nodes, at least one of said communications ports for connection to the first fabric and at least one of said communications ports for connection to the second fabric;

a processor;

memory coupled to said processor and storing programs executed by said processor; and logic coupled to said processor and said communication ports, including said communication port for connection to the first fabric and said communication port for connection to the second fabric, and transferring cluster membership messages between said ports and said processor, wherein said stored programs include a program for controlling cluster membership and a program to compare cluster membership for the first and second fabrics, said processor executing said cluster membership stored programs to process cluster membership messages from the nodes.

23. The device of claim 22, the device also for use with a second device separate from said plurality of nodes and not a portion of said cluster for transferring messages, the second device coupled to each of the nodes forming the cluster, the second device transferring data messages between the nodes and receiving cluster membership messages from the nodes, wherein said device communication ports are further for coupling to the second device, wherein the device is connectable to at least one of the nodes and processes cluster membership messages from the nodes to which it is connectable, and wherein the device can exchange cluster membership messages with the second device.

24. The device of claim 23, wherein said cluster membership messages which can be exchanged between the device and the second device include messages indicating the removal of a node from the cluster.

25. The device of claim 24, wherein said cluster membership messages received by the device from the nodes include heartbeat messages indicating status of the node.

26. The device of claim 22, wherein said cluster membership messages received by the device from the nodes include heartbeat messages indicating status of the node.

27. The device of claim 22, wherein the device does not transfer data messages between said communications port for connection to the first fabric and said communications port for connection to the second fabric.

* * * * *